A. KRAH.
LOCK JOINT FOR WIND SHIELDS.
APPLICATION FILED APR. 19, 1913.
1,074,958.
Patented Oct. 7, 1913.
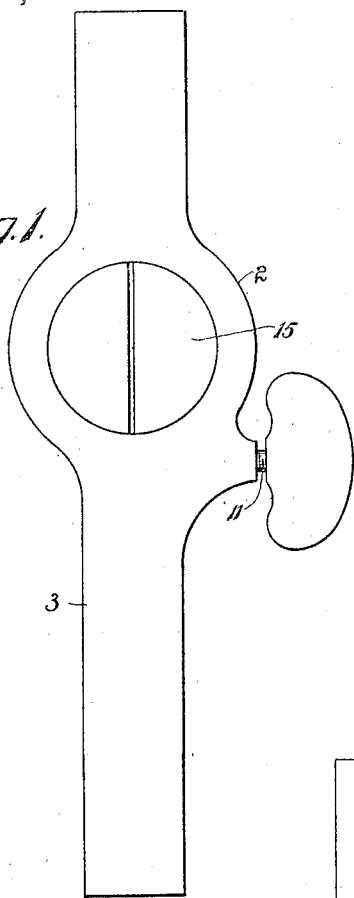
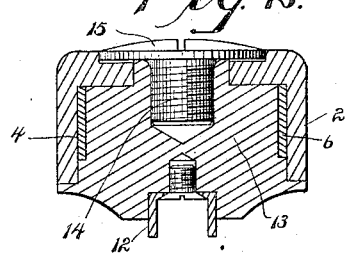
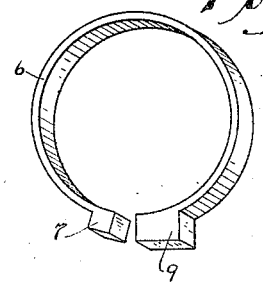
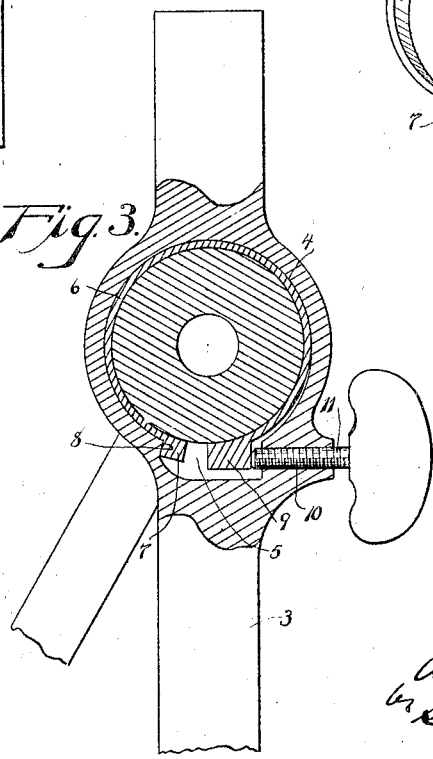

UNITED STATES PATENT OFFICE.

ALEXIS KRAH, OF NEW HAVEN, CONNECTICUT, ASSIGNOR TO THE ENGLISH AND MERSICK CO., OF NEW HAVEN, CONNECTICUT, A CORPORATION.

LOCK-JOINT FOR WIND-SHIELDS.

1,074,958. Specification of Letters Patent. Patented Oct. 7, 1913.

Application filed April 19, 1913. Serial No. 762,253.

*To all whom it may concern:*

Be it known that I, ALEXIS KRAH, a citizen of the United States, residing at New Haven, in the county of New Haven and State of Connecticut, have invented a new and useful Improvement in Lock-Joints for Wind-Shields; and I do hereby declare the following, when taken in connection with the accompanying drawings and the characters of reference marked thereon, to be a full, clear, and exact description of the same, and which said drawings constitute part of this application, and represent, in—

Figure 1 a side view of a lock joint constructed in accordance with my invention; Fig. 2 a transverse sectional view through the hub; Fig. 3 a side view partly in vertical section; Fig. 4 a perspective view of the clamping band, detached.

This invention relates to an improvement in lock-joints for wind shields, and particularly to an improvement in lock joints such as shown in United States patent granted July 2nd, 1912, No. 1,031,275.

In my former patent I employed a spring band surrounding a hub on one member of the joint, a lever engaging with one end of the band, and means for turning said lever whereby the band might be contracted.

The object of this invention is to simplify means for moving the band, to provide a casing which may be welded to the supporting rods and a casing which may be readily formed by drop forging; and the invention consists in the construction hereinafter described and particularly recited in the claim.

In carrying out my invention, I employ a casing 2 provided with a long stump 3 which may be welded or otherwise secured to the usual supporting framework. In this casing is a circular chamber 4 and opening out of this chamber is a recess 5. Within the chamber is a spring band 6 formed at one end with a hook lug 7 adapted to engage with one wall 8 of the recess 5. The other end of the band is provided with a bearing lug 9 arranged in line with a screw threaded opening 10 formed in the casing and entering into the recess 5. In this opening 10 is a screw 11 the inner end of which bears against the bearing lug 9.

Attached to the shield frame 12 in the usual manner is a hub 13 having a diameter somewhat smaller than the diameter of the chamber 4 and so as to fit within the spring band located in that chamber. This hub may be secured in the chamber in any desired manner as herein shown, by a screw 14 the head 15 of which overlaps the outer face of the casing. By turning the screw 11 inward the spring band is contracted around the hub so as to firmly lock the hub in the casing, while an outward movement of the screw releases the pressure of the band upon the hub and allows the shield to be adjusted to any desired extent. By adjusting the band by means of the bearing-lug 9 the adjusting screw may be arranged closely adjacent to the casing 2, and as the pressure is direct upon the band a slight movement of the screw is only necessary to firmly clamp the band to the hub.

The long stump 3 permits the casing to be welded to the frame support and by forming a comparatively small recess opening out of the chamber in the casing the casing with its stump may be readily produced by forging.

I claim:—

A lock joint comprising a casing having a circular chamber and a recess opening out of said chamber, a hub located in said chamber than which it is smaller in diameter, a spring band surrounding the hub, said band provided at opposite ends respectively with a hook-lug and a bearing-lug extending into said recess, and a screw entering the recess in line with said bearing-lug, the inner end of the screw bearing against said bearing-lug whereby said band may be contracted.

In testimony whereof, I have signed this specification in the presence of two subscribing witnesses.

ALEXIS KRAH.

Witnesses:
MARTHA M. THEISS,
CARL W. JOHNSON.